Jan. 18, 1949.   W. R. MABREY   2,459,232
COMBINATION FRUIT OR FLOWER CUTTER AND HOLDER
Filed March 28, 1947
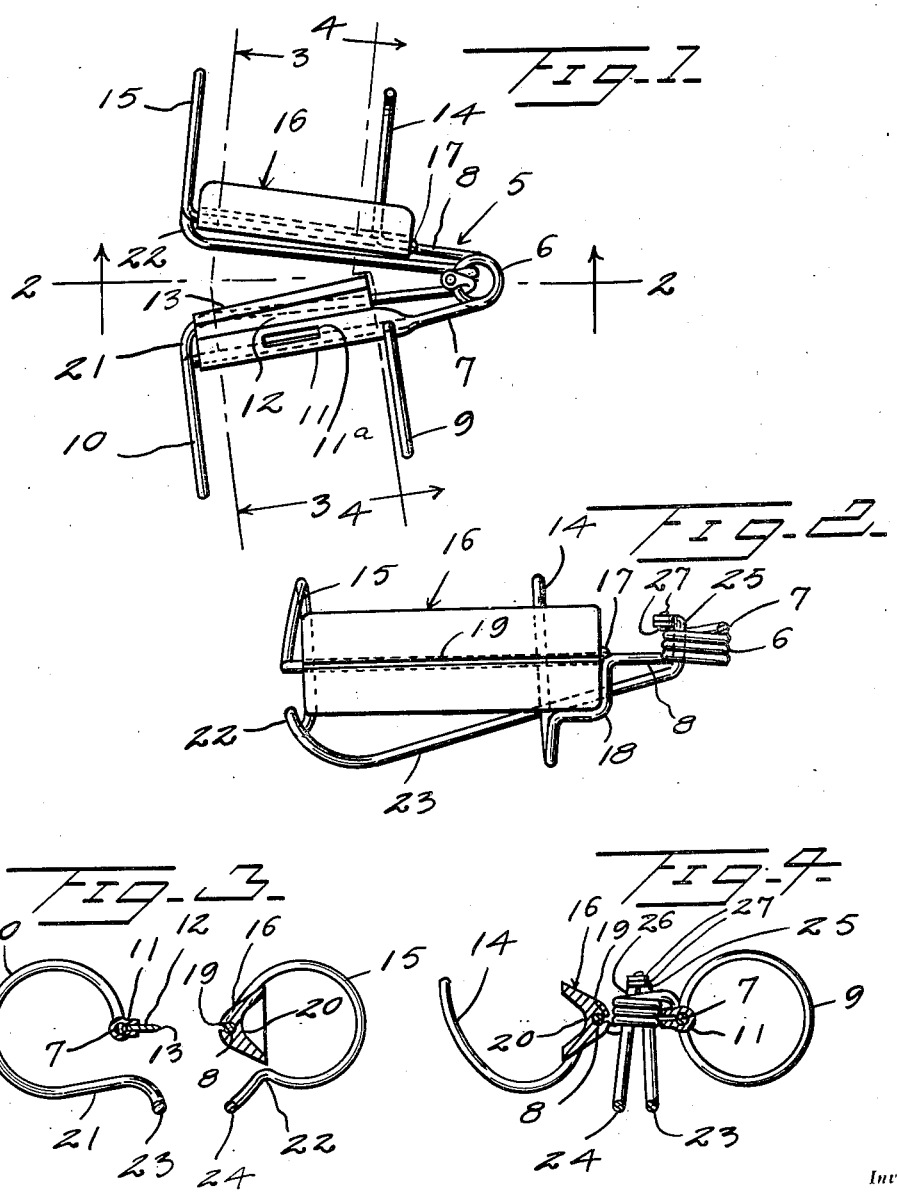
Inventor
Willis R. Mabrey
By Randolph & Beavers
Attorneys Patented Jan. 18, 1949

2,459,232

UNITED STATES PATENT OFFICE 2,459,232

COMBINATION FRUIT OR FLOWER CUTTER AND HOLDER

Willis R. Mabrey, Oildale, Calif.

Application March 28, 1947, Serial No. 737,949

9 Claims. (Cl. 30—135)

This invention relates to an implement adapted to be supported on the hand and be utilized for cutting and holding the stems of fruit or flowers, so that by a single operation the stem of a piece of fruit or of a flower may be severed and grasped by the implement and thus supported until moved to a position to be released into a suitable receptacle.

More particularly, it is an object of the invention to provide an implement of the afore described character capable of being readily used efficiently with the thumb and index finger of either hand so that an implement may be applied to each hand and both hands employed simultaneously for cutting or harvesting flowers and fruit or the like.

Still a further aim of the invention is to provide an implement having resilient means for normally maintaining it in an inoperative, open position and which is actuated readily by a manual pressure of the index and thumb being moved toward one another for moving the cutting and clamping portions of the implement into operative position for simultaneously cutting and clamping a flower or fruit stem.

Still a further object of the invention is to provide an implement of the afore described character of extremely simple construction capable of being economically manufactured and sold and which is very light in weight so that it will constitute substantially no burden on the hand or fingers of the user.

Various other objects and advantages of the invention will hereinafter become more fully apparent from the following description of the drawing, illustrating a preferred embodiment thereof, and wherein:

Figure 1 is a top plan view of the implement in its normal position for use in harvesting fruit, such as bunches of grapes, and Figures 2, 3 and 4 are sectional views of the implement taken substantially along planes as indicated by the lines 2—2, 3—3 and 4—4, respectively, of Figure 1.

Referring more specifically to the drawing, the combination cutter and holder in its entirety is designated generally 5 and includes a coiled spring 6 preferably formed of a relatively heavy gauge strand of resilient wire having legs 7 and 8 projecting from the top and bottom of the coiled portion 6 and in normally diverging relationship to one another, as clearly illustrated in Figure 1. The leg 7 is provided with longitudinally spaced, substantially parallel ring or loop portions 9 and 10 which project outwardly therefrom and which are disposed substantially at right angles to the axis of the leg 7. The rings or loops 9 and 10 may be formed integral with the leg 7 or suitably secured thereto in any desired manner, as by welding or soldering. The leg 7, between the rings or loops 9 and 10 is provided with an inwardly opening substantially channel shaped blade support 11 in which a blade 12, such as a safety razor blade is adapted to be fixedly or detachably mounted and so that the cutting edge 13 thereof will be facing inwardly or toward the leg 8. The support 11 is provided with a slot 11a adapted to receive a knife point (not shown) for engagement behind blade 12 to facilitate ejecting the latter from support 11.

As seen in Figure 1, the loop or ring 9 is disposed adjacent the coil 6 and the loop or ring 10 is disposed at the outer end of the leg 7. The leg 8 is provided with an outwardly and upwardly curved hook-shaped portion 14 forming a semi-loop and disposed in corresponding relationship to the loop 9 and has a loop or ring portion 15 at its outer end corresponding to the loop 10. A guard 16, preferably formed of a soft metal and which is arcuate shape in cross section is mounted on the leg 8 between the portions 14 and 15 with said leg 8 extending through the thickened central or bight portion of the guard 16 and being suitably secured thereto in any suitable manner as by soldering or welding, as indicated at 17. As seen in Figure 2, the hook shaped portion 14 is provided with an offset portion 18 to accommodate the lower part of the inner end of the guard 16. As best seen in Figure 3, the convex side of the guard 16 faces inwardly or toward the blade 12 and has a longitudinal groove 19 to receive the cutting edge 13 when legs 7 and 8 are moved toward one another. The concave opposite side 20 thereof faces outwardly.

As best illustrated in Figure 3, the complementary ring or loop portions 10 and 15 preferably form integral extensions of the legs 7 and 8, respectively, and have complementary ends formed integral with said legs and opposite ends 21 and 22, respectively, terminating in spaced apart relationship thereto or to the legs 7 and 8 and which are provided with extensions 23 and 24, respectively, which initially extend inwardly toward one another from the ring or loop portions 10 and 15 and which are thereafter turned rearwardly and extend toward the spring coil 6. The portions 23 and 24 terminate at their inner or rear ends in upturned legs 25 and 26, respectively, which are disposed loosely in the bore of spring 6 and thereby pivotally mounted relatively to each other. Legs 25 and 26 have outturned terminals 27 to prevent their disengagement from spring 6. The strand portions 23 and 24 are normally disposed in outwardly diverging relationship, substantially corresponding to the normally outwardly diverging relationship of the cutting edge 13 to the guard 16.

To employ the cutter and holder 5 for cutting grapes or other fruit, not shown, the index finger of the right hand is passed through the portions 14 and 15 and bears against the concave side 20 of the guard 16, and the thumb of said right hand, not shown, is inserted through the loops or rings 9 and 10 so that the spring coil 6 will be disposed at the root or bight of the thumb and index finger. By exerting an inward pressure with the thumb and index finger for moving said parts toward one another, the blade 12 and guard 16 will be swung toward one another and likewise the strand portions 23 and 24, forming jaws, will swing toward one another, all of said parts moving toward positions in parallel relationship to their complementary parts. Assuming that the stem of a bunch of grapes, not shown, is disposed between the jaws 23 and 24 and between the blade 12 and guard 16, said stem will be initially clamped between the jaws 23 and 24 and immediately thereafter or almost simultaneously the stem will be cut thereabove by the cutting edge 13 moving into engagement with the groove 19 of the guard 16. By retaining the parts thus disposed, the bunch of grapes will be grasped between the clamping jaws 23 and 24 and thus held until moved to a position over a basket or other receptacle at which time inward pressure is released by the thumb and index finger allowing the coil spring 6 to return the thumb and finger and parts to their positions of Figure 1 to release the bunch of grapes and to position the implement 5 ready to repeat the operation, previously described.

By inverting the implement 5 so that the thumb engages the portions 14 and 15 and the index finger engages the portions 9 and 10, said implement can be operated in the same manner for cutting flowers and with the holding jaws 23 and 24 disposed above the cutting blade 12 so that the flower stem will be clamped between the jaws 23 and 24 between the flower and the cut made in the stem by the blade 12 thus enabling the flower to be grasped and held until placed in a suitable receptacle or otherwise disposed of.

As best illustrated in Figure 4, the legs 7 and 8 are offset adjacent the spring coil 6 so as to be disposed in substantially the same plane in order that the cutting edge of the blade will move toward the intermediate portion of the guard, containing the groove 19, and so that the jaws 23 and 24 will be nearly in the same plane.

Various modifications and changes are contemplated and may obviously be resorted to, without departing from the spirit and scope of the invention as hereinafter defined by the appended claims.

I claim as my invention:

1. In a holder and cutter for fruit and flowers or the like, a coiled spring having legs projecting from the ends thereof in normally diverging relationship, finger engaging portions projecting outwardly from each of the legs, a blade carried by one of said legs extending longitudinally thereof and disposed with its cutting edge facing toward the other of said legs, said other leg being provided with a finger guard having a longitudinally extending groove disposed to receive the cutting edge of the blade when said legs are moved toward one another against the resiliency of the coiled spring, and gripping jaws forming extensions of the legs and disposed in offset, substantially parallel relationship to the blade and guard and adapted to be actuated simultaneously therewith for grasping the stem of a flower or fruit as it is severed by the cutting blade.

2. An implement as in claim 1, said legs having offset portions disposed adjacent the coiled spring for positioning the legs in substantially the same plane, and said jaws being disposed in a plane substantially parallel to the legs and being disposed in outwardly diverging relationship to one another and substantially corresponding to the relationship of the blade and guard, when the implement is in an open, inoperative position.

3. An implement as in claim 1, said jaws being pivotally connected at their inner, terminal ends.

4. An implement as in claim 1, said legs having offset portions disposed adjacent the coiled spring for positioning the legs in substantially the same plane, and said jaws being disposed in a plane substantially parallel to the legs and being disposed in outwardly diverging relationship to one another and substantially corresponding to the relationship of the blade and guard, when the implement is in an open, inoperative position, said jaws being pivotally connected at their inner, terminal ends.

5. A holding and cutting implement as in claim 1, the finger engaging portions of one of said legs being adapted to engage the index finger and the finger engaging portions of the other leg being adapted to engage the thumb of the same hand for positioning the coiled spring adjacent the root and bight of said index finger and thumb and whereby the jaws will be moved toward gripping engagement and the blade will be moved into cutting position relatively to the guard when said legs are moved toward one another by inward movement of the thumb and index finger, said coiled spring functioning to bias the parts back to their original, open positions.

6. In a holder and cutter for fruit and flowers or the like, a coiled spring having legs projecting from the ends thereof in normally diverging relationship, finger engaging portions projecting outwardly from each of the legs, a blade carried by one of said legs extending longitudinally thereof and disposed with its cutting edge facing toward the other of said legs, said other leg being provided with a finger guard having an inwardly opening groove extending longitudinally of the legs and disposed to receive the cutting edge of the blade when said legs are moved toward one another against the resiliency of the coiled spring, and gripping jaws forming extensions of the legs and disposed in offset, substantially parallel relationship to the blade and guard and adapted to be actuated simultaneously therewith for grasping the stem of a flower or fruit as it is severed by the cutting blade, said guard being of arcuate cross section and having an inner convex side facing toward the cutting edge of the blade and in which said groove is formed and an outer, concave side adapted to receive the finger or thumb for shielding said parts from the cutting edge of the blade.

7. An implement as in claim 6, said first mentioned leg being provided with a blade holder extending between the finger engaging portions thereof, said blade holder being channel shaped and being disposed to open inwardly for supporting the blade on the inner side of said leg and with the cutting edge thereof facing toward said guard.

8. An implement as in claim 6, said gripping jaws having upturned terminal portions loosely disposed in the coil spring and pivotally mounted thereby relatively to one another.

9. An implement as in claim 6, said first mentioned leg being provided with a channel shape blade holder for receiving the blade and having the channel portion thereof opening inwardly, and said blade holder being provided with a slot communicating with said channel portion and adapted to receive a pointed instrument for engagement with the back edge of the blade for ejecting the blade therefrom.

WILLIS R. MABREY.

REFERENCES CITED

The following references are of record in the file of this patent:

UNITED STATES PATENTS

| Number | Name | Date |
| --- | --- | --- |
| 693,753 | Starrett | Feb. 18, 1902 |
| 1,775,086 | Bonehill | Sept. 9, 1930 |
| 1,775,562 | Kerns | Sept. 9, 1930 |